US007225074B2

(12) United States Patent
Jehle

(10) Patent No.: US 7,225,074 B2
(45) Date of Patent: May 29, 2007

(54) ENGINE CONTROL SYSTEM FOR AN INTERNAL COMBUSTION ENGINE HAVING A PLURALITY OF CYLINDERS

(75) Inventor: Martin Jehle, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/368,215

(22) Filed: Mar. 3, 2006

(65) Prior Publication Data

US 2006/0200298 A1 Sep. 7, 2006

(30) Foreign Application Priority Data

Mar. 4, 2005 (DE) ..................... 10 2005 010 029

(51) Int. Cl.
*B60T 7/12* (2006.01)
*F02D 1/00* (2006.01)

(52) U.S. Cl. ............ 701/104; 123/339.11; 123/406.23; 123/406.47; 701/115

(58) Field of Classification Search ................ 701/104, 701/110, 111, 115; 123/339.11, 339.14, 350, 123/406.23, 406.24, 406.25, 406.47, 435, 123/436
See application file for complete search history.

(56) References Cited

U.S. PATENT DOCUMENTS 4,976,239 A * 12/1990 Hosaka ....................... 123/399
5,713,317 A * 2/1998 Yoshioka ................. 123/90.15
5,857,437 A * 1/1999 Yoshioka ................. 123/90.15
5,937,808 A * 8/1999 Kako et al. .............. 123/90.15
6,260,524 B1 * 7/2001 Wachi ..................... 123/90.15
6,340,014 B1 * 1/2002 Tomita et al. .............. 123/295
6,842,686 B2 * 1/2005 Homeyer et al. ............. 701/84
6,920,383 B2 * 7/2005 Graf et al. .................... 701/51

OTHER PUBLICATIONS

"Handbuch Verbrennungsmotoren" (Handbook of combustion engines), Jun. 2002, pp. 554-556, 2nd edition, Richard van Basshuysen/Fred Schäfer, Friedrich Vieweg and Sohn Verlagsgesellschaft, Braunschweig/Wiesbaden.

* cited by examiner

*Primary Examiner*—John T. Kwon

(57) ABSTRACT

An engine control system comprises a first control device which is associated with a first section of the cylinders, and a second control device which is associated with a second section of the cylinders. The first control device is designed in order to determine an intermediate required value (TQI_INT_SP_FAST) for a torque to be set quickly which is set by way of one or more final control elements for setting a quantity of fuel that is to be metered or an ignition angle. The intermediate required value (TQI_INT_SP_FAST) is determined depending on at least one operating variable of the internal combustion engine. The first control device is also designed in order to determine at least one correction value for the torque to be set quickly [lacuna] at least one operating variable. The first control device has a communications interface for communicating the intermediate required value (TQI_INT_SP_FAST) and the at least one correction value to a communications interface of the second control device. The second control device is designed in order to determine a required value (TQI_FAST2) of a fast torque to be set depending on the intermediate required value (TQI_INT_SP_FAST), the at least one correction value and at least one measured variable associated with the second control device, and in order to set the required value (TQI_FAST2).

20 Claims, 3 Drawing Sheets

ENGINE CONTROL SYSTEM FOR AN INTERNAL COMBUSTION ENGINE HAVING A PLURALITY OF CYLINDERS

CROSS REFERENCE TO RELATED APPLICATIONS

This application claims the benefits of German Patent application No. 10 2005 010 029.5 DE filed Mar. 4, 2005, which is incorporated by reference herein in its entirety.

FIELD OF THE INTENTION

The invention relates to an engine control system for an internal combustion engine having a plurality of cylinders. Internal combustion engines having a large number of cylinders, in other words ten or more cylinders for example, generally have two banks of cylinders. A separate control device is associated with each cylinder bank. One of the control devices assumes a master function and the other a slave function. The control device in question is designed in order to determine and generate control signals for actuators which are associated with the cylinders that it controls. A precise control of the internal combustion engine is important on the one hand to ensure compliance with strict legal provisions in respect of permissible harmful emissions and on the other hand to afford convenient operation of the internal combustion engine.

BACKGROUND OF THE INVENTION

A torque-based function architecture for engine control units is known from the German technical book entitled “Handbuch Verbrennungsmotoren” (handbook of combustion engines), 2nd Edition June 2002, publisher Richard van Basshuysen/Fred Schäfer, Friedrich Vieweg und Sohn Verlagsgesellschaft, Braunschweig/Wiesbaden, pp. 554 to 556. The engine control unit is implemented in order to interpret the driver’s desired action as a torque request. This torque request can be changed by means of various control actions, such as regulation of the traveling speed, damping of the bonanza effect or by means of gearbox interventions for example. The torque resulting from this is simultaneously fed into two paths in the torque structure; these are the slow torque setting path, which is also referred to as injection path or slow air path, and the fast torque setting path, which is also referred to as ignition path or fast ignition path. Final control elements in the air path, such as a throttle valve for example, are controlled appropriately by way of the injection path in order to set the torque appropriately. The ignition angles, an air/fuel ratio and a cylinder shutdown are set by way of the fast torque setting path in accordance with the torque to be set. With regard to complex engine control units, the torque structure makes possible uniformly defined interfaces between the different functions of the engine control unit and thus a clear and easily understandable functional architecture within the engine control unit.

SUMMARY OF THE INVENTION

The object of the invention is to set down an engine control system for an internal combustion engine having a plurality of cylinders which enables precise control of the internal combustion engine.

This object is achieved by the features of the claims. Advantageous embodiments of the invention are set down in the subclaims.

The invention is characterized by an engine control system for an internal combustion engine having a plurality of cylinders and having a first control device which is associated with a first section of the cylinders, and having a second control device which is associated with a second section of the cylinders. By preference, one control device is assigned in each case to one cylinder bank of the internal combustion engine. The first control device is designed in order to determine an intermediate required value for a torque to be set quickly which is set by way of one or more final control elements for setting a quantity of fuel that is to be metered or an ignition angle. The intermediate required value is determined depending on at least one operating variable of the internal combustion engine. Operating variables are measured variables and variables derived from the latter.

The first control device is also implemented in order to determine at least one correction value for the torque to be set quickly depending on at least one operating variable. It has a communications interface for communicating the intermediate required value and the at least one correction value to a communications interface of the second control device. The second control device is designed in order to determine a required value of a fast torque to be set in the cylinders associated with the second control device depending on the intermediate required value, the at least one correction value and at least one measured variable associated with the second control device. It is furthermore also designed in order to set the required value.

The engine control system thus makes it possible in a simple manner to consistently determine the intermediate required value and the correction value or values both for the first and also for the second control device. In addition, it also makes it possible to calculate in a very timely manner the required value of the fast torque to be set in the cylinders associated with the second control device, whereby temporally particularly current values of the at least one measured variable associated with the second control device can be taken into consideration. This is made possible by the fact that for this purpose corresponding data representing the intermediate required value and the correction value or values simply needs to be transferred from the first control device to the second control device. A high quality of control of the internal combustion engine can thus be achieved in a simple manner, particularly in respect of cylinders which are associated with the second control device.

According to an advantageous embodiment of the invention, the second control device is designed in order to determine a maximum basic torque which under predefined conditions can be quickly set in the cylinders associated with the second control device, and this is actually done depending on at least one measured variable associated with the second control device. The predefined conditions correspond to conditions relating to permissible harmful emissions or also to knocking under normal conditions. In this connection the control device is also designed in order to determine the required value depending on the basic torque. In this manner, it is possible to achieve a particularly simple calculation structure and a very good applicability.

According to a further advantageous embodiment of the invention, the at least one correction value includes at least one fast portion of a regulator correcting variable. The fast portion of the regulator correcting variable can thus be determined simply only in the first control device for use both in the first and also in the second control device and can furthermore also be set precisely in the second control device. By preference, the fast portion of the regulator correcting variable is a corresponding idling regulator portion or an anti-jolting regulator portion.

According to a further advantageous embodiment of the invention, the first control device is designed in order to communicate the correction values as a sum correction value. In this manner, it is simply necessary to transfer a small quantity of data from the communications interface of the first control device to the communications interface of the second control device.

BRIEF DESCRIPTION OF THE DRAWINGS

Embodiments of the invention are described in detail in the following with reference to the schematic drawings. In the drawings.

Elements having the same construction or function are identified across all figures by the same reference characters.

DETAILED DESCRIPTION OF THE INVENTION

Figure 1:
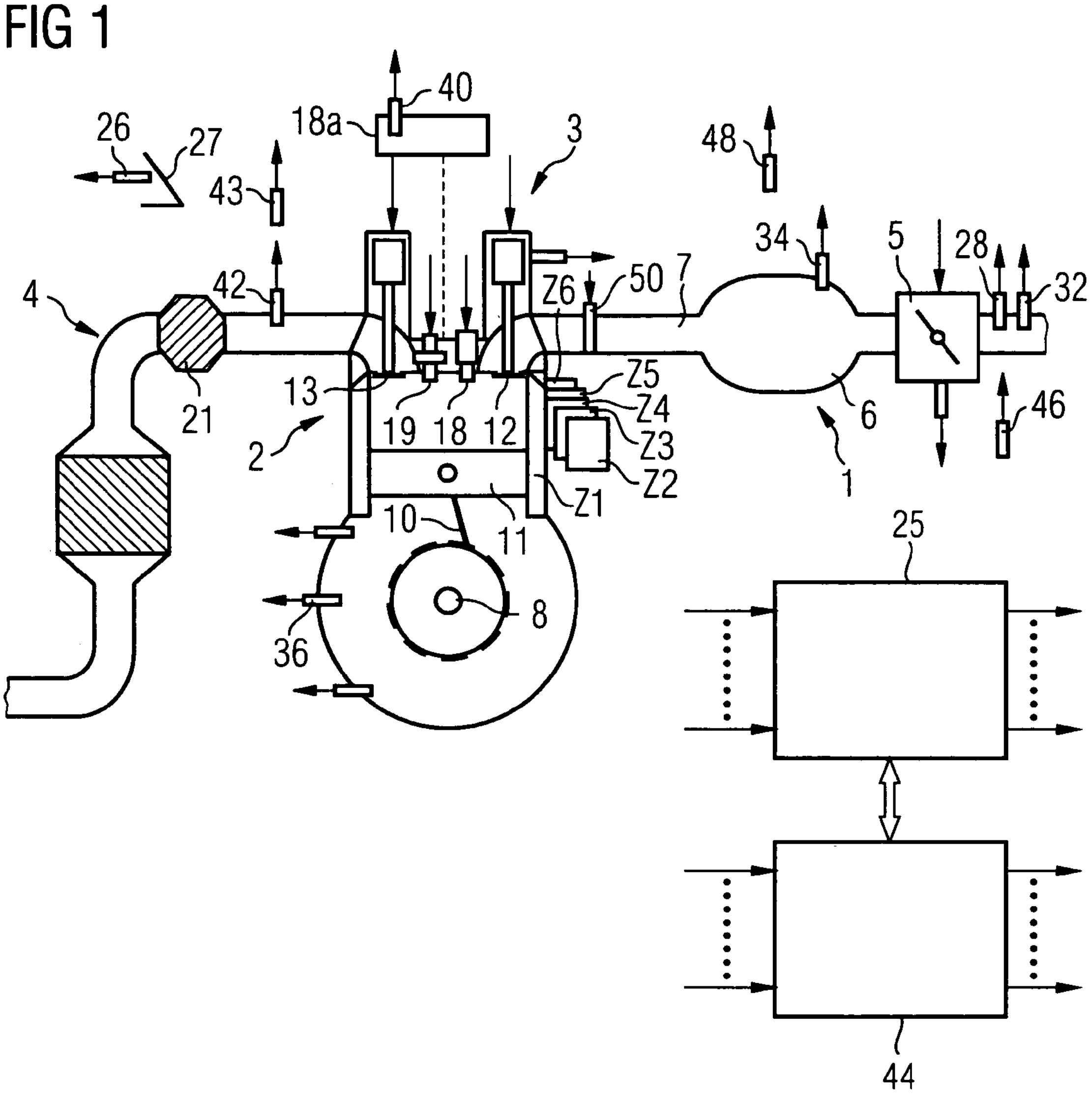
FIG. 1 shows an internal combustion engine which includes an engine control system.

An internal combustion engine (FIG. 1) comprises an intake tract 1, an engine block 2, a cylinder head 3 and an exhaust tract 4. The intake tract 1 preferably includes a throttle valve 5, and also a collector 6 and an induction manifold 7 which is routed by way of an inlet port into the engine block 2 to a cylinder Z1. The engine block 2 also includes a crankshaft 8 which is linked by way of a connecting rod 10 to the piston 11 of the cylinder Z1.

The cylinder head 3 comprises a valve drive with a gas inlet valve 12 and a gas outlet valve 13. The cylinder head 3 also comprises an injection valve 18 and a spark plug 19.

Located in the exhaust tract 4 is an exhaust catalytic converter 21 which is preferably designed as a three-way catalytic converter.

The internal combustion engine comprises a plurality of cylinders Z1–Z6 which are preferably associated in each case with one of at least two cylinder banks. By preference, in each case an intake tract 1 and an exhaust tract 4 are associated with each cylinder bank. The internal combustion engine preferably has at least ten cylinders. However, it can also have less than ten cylinders.

A first and a second control device 25, 44 are provided, with which sensors are associated that capture different measured variables and determine the value of the measured variable in each case. Depending on at least one of the measured variables, the control devices 25, 44 determine correcting variables which are then converted into one or more control signals for controlling the final control elements associated with the respective control device 25, 44 by means of appropriate actuators. The control devices 25, 44 can also be referred to as a device for controlling the internal combustion engine and form an engine control system.

The sensors are a pedal position sensor 26 which senses an accelerator pedal position PV of an accelerator pedal 27, a first air mass sensor 28 which senses an air mass stream upstream of the throttle valve 5 in the intake tract 1 associated with the first cylinder bank, a first temperature sensor 32 which senses an intake air temperature, a first induction manifold pressure sensor 34 which senses an induction manifold pressure in the collector 6 in the intake tract 1 associated with the first cylinder bank, and a crankshaft angle sensor 36 which senses a crankshaft angle, with which a rotational speed N is then associated.

In addition, a first exhaust gas probe 42 is provided which is located upstream of the exhaust catalytic converter 21 in the exhaust tract 4 associated with the first cylinder bank and which senses a residual oxygen content of the exhaust gas, and whose measurement signal is characteristic of the air/fuel ratio in the combustion chamber of the cylinders Z1–Z6 of the first cylinder bank prior to oxidation of the fuel. In addition, a second exhaust gas probe 43 is provided which is located upstream of the exhaust catalytic converter 21 in the exhaust tract 4 associated with the second cylinder bank and which senses a residual oxygen content of the exhaust gas, and whose measurement signal is characteristic of the air/fuel ratio in the combustion chamber of the cylinders Z1–Z6 of the second cylinder bank prior to oxidation of the fuel.

In addition, a fuel pressure sensor 40 is provided which senses a fuel pressure in the fuel feed unit 18*a*, in particular in a high-pressure reservoir of the fuel feed unit.

Furthermore, a second air mass sensor 46 is provided which senses an air mass stream upstream of the throttle valve 5 in the intake tract 1 associated with the second cylinder bank, and a second induction manifold pressure sensor 48 which senses an induction manifold pressure in the collector 6 in the intake tract 1 associated with the second cylinder bank.

Depending on the embodiment of the invention, any desired subset of the aforementioned sensors can be present or it is also possible for additional sensors to be present.

The final control elements are for example the throttle valve 5, the gas inlet and gas outlet valves 12, 13, the injection valve 18 or the spark plug 19, or also a pulse loading valve 50. By preference, a throttle valve is associated in each case with each cylinder bank and at least one gas inlet and gas outlet valve 12, 13, an injection valve 18 and if applicable the spark plug 19 or also a pulse loading valve 50 are associated with each cylinder Z1–Z6.

The first air mass sensor 28, the first induction manifold pressure sensor 34 and the first exhaust gas probe 42 are associated with the first control device 25. The second air mass sensor 46, the second induction manifold pressure sensor 48 and the second exhaust gas probe 43 are associated with the second control device 44. The remaining sensors are preferably associated at least in part exclusively with the first control device 25, which is preferably implemented as a master, while the second control device 44 is preferably implemented as a slave.

Figure 2:
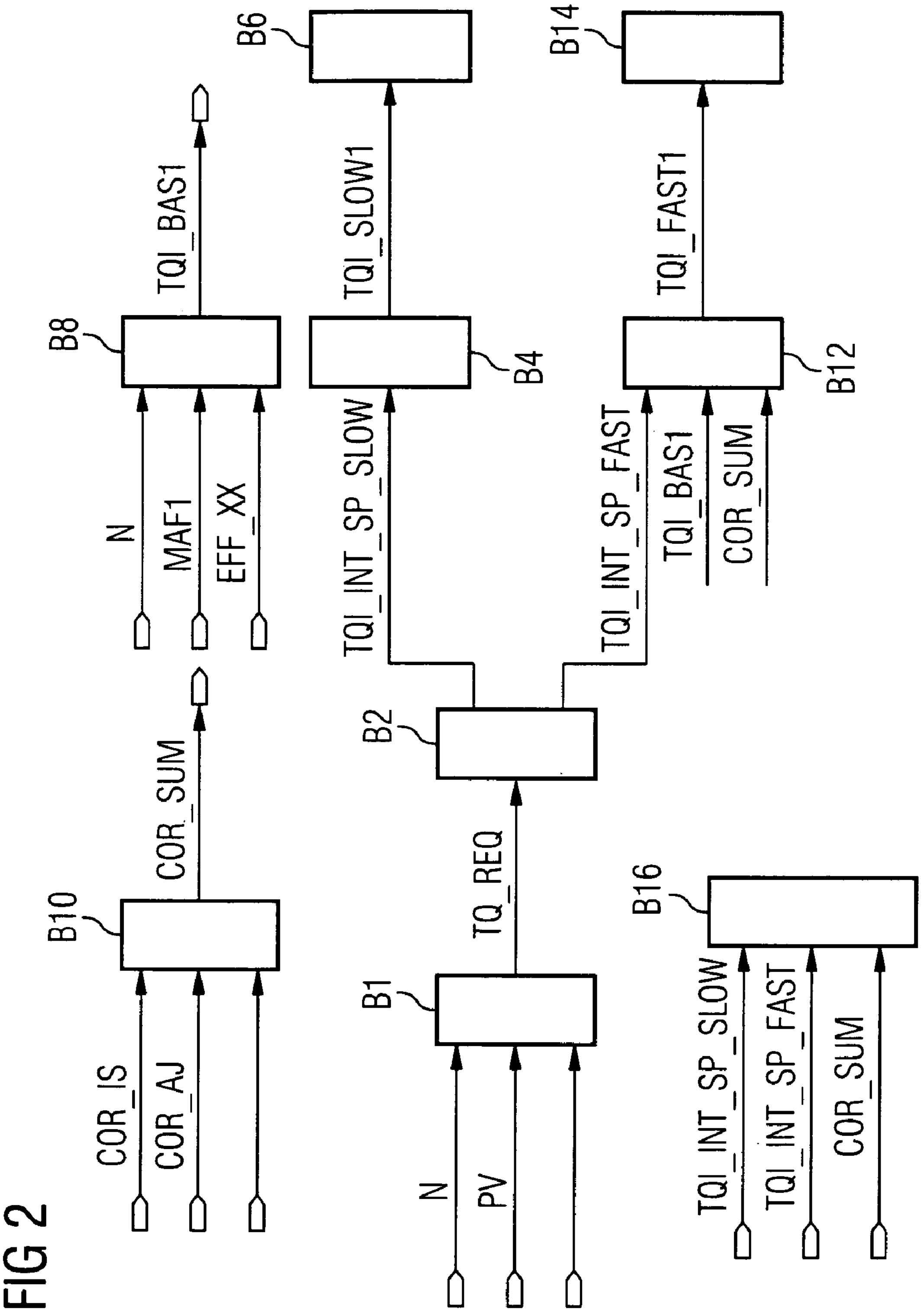
FIG. 2 shows a block diagram of a first control device of the internal combustion engine.
Figure 3:
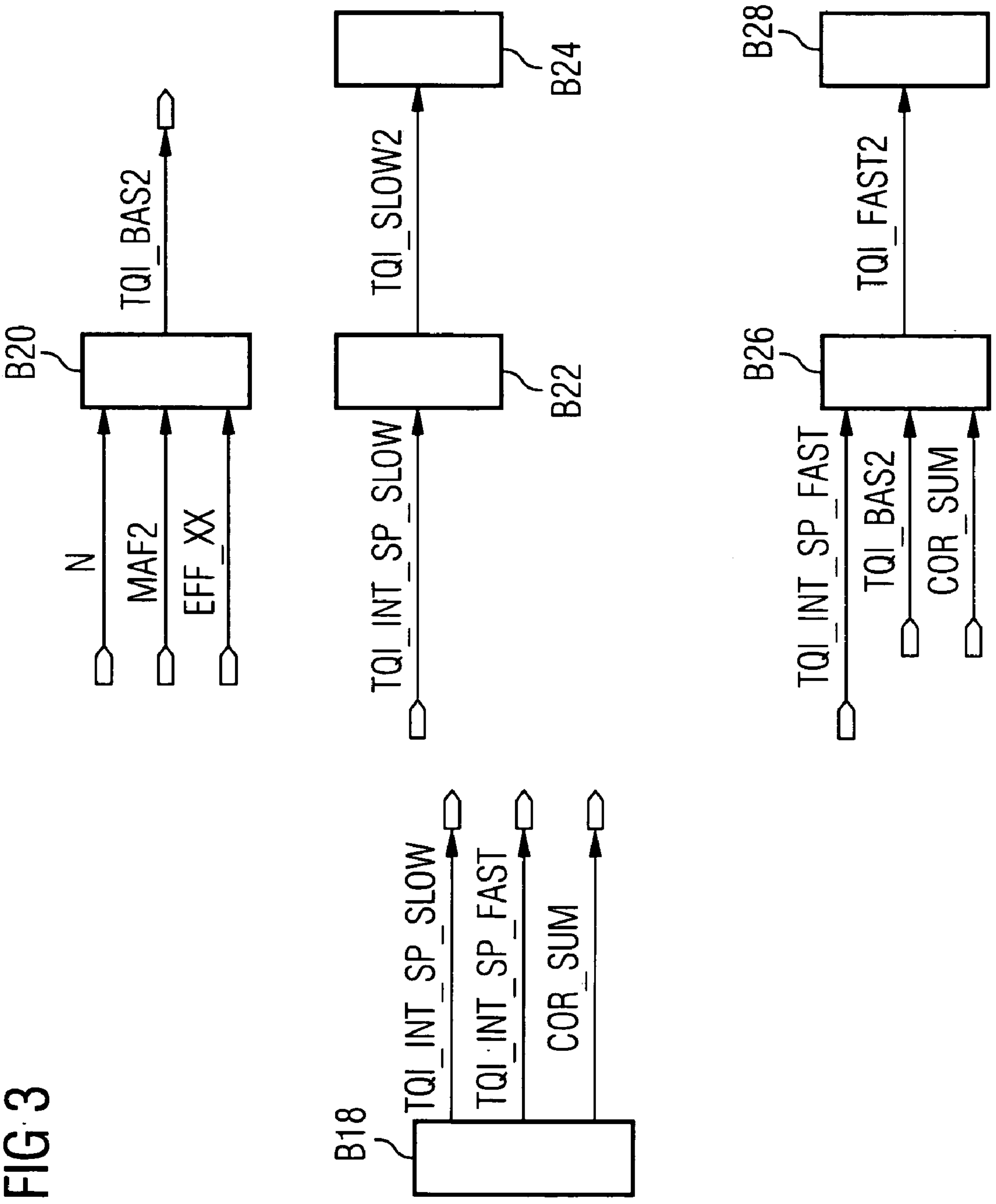
FIG. 3 shows a block diagram of a second control device of the internal combustion engine.

The elements of the first and second control device 25, 44 respectively which are relevant to the invention are illustrated by means of the block diagrams in FIGS. 2 and 3.

The first control device 25 is described in detail in the following with reference to the block diagram shown in FIG. 2. A block B1 is designed in order to determine a driver requested torque TQ_REQ, depending on the rotational speed N and the accelerator pedal position PV and, preferably, further operational variables of the internal combustion engine. Operational variables are measured variables and variables derived therefrom. For this purpose, it is possible for example to determine a minimum and maximum currently available torque. Depending on the accelerator pedal value and the rotational speed, it is possible to determine a driver request factor. Depending on the driver request factor and the torque range resulting from the minimum and maximum torque, it is possible to determine the driver requested torque TQ_REQ.

In a block B2, an intermediate required value TQI_INT_SP_SLOW of a torque to be set slowly and an intermediate required value TQI_INT_SP_FAST of a torque to be set quickly are determined, this being done depending on the driver requested torque TQ_REQ. In the block B2, when determining the intermediate required values TQI_INT_SP_SLOW and TQI_INT_SP_FAST consideration is preferably given to torque requests from other functions of the engine control unit or of one or more other systems of the motor vehicle in which the internal combustion engine can be located. Thus for example, in block B2 torque requests from a catalytic converter protection function, a gearbox control unit, a rotational speed limiter, a speed limiter, a power limiter, an anti-spin control and/or an engine drag torque regulator are taken into consideration.

In a block B4, depending on the intermediate required value TIQ_INT_SP_SLOW of the torque to be set slowly; a first required value TQI_SLOW1 of the torque to be set slowly is determined. In this connection, it is also possible to make yet further corrections.

In a block B6, depending on the first required value TQI_SLOW1 of the torque to be set slowly, control signals for one or more final control elements of an air path of the first cylinder bank are then determined and generated in order to set the first required value TQI_SLOW1 of the torque to be set slowly. The final control elements can be, for example, the throttle valve 5, the pulse loading valve 50, the gas inlet valve 12 or, for example, an exhaust turbocharger or even a compressor which are not shown.

An idling regulator in the first control device 25 is designed in order to determine an idling fast correction value COR_IS. An anti-jolting regulator is designed in order to determine an anti-jolting fast correction value COR_AJ. An anti-jolting regulator is provided so as to avoid uncomfortable jolting of the vehicle which can be caused by sudden changes in torque in the vehicle in which the internal combustion engine is located, such as can arise when driving off from a standstill, accelerating briskly, shifting gear, but also when driving at low speed in high gears. A block B10 is providing for determining a sum correction value COR_SUM depending on the idling fast correction value COR_IS, the anti-jolting fast correction value COR_AJ and, if applicable, further correction values.

A block B8 is provided which is designed in order to determine a first basic torque TQI_BAS1 depending on the rotational speed N and the first air mass stream MAF1 which is sensed by the first air mass sensor 28 and is also dependent on efficiency values EFF_XX. To this end, a characteristic field is preferably provided from which, depending on the rotational speed N and the first air mass stream MAF1, a reference torque can be determined which can theoretically be set in the cylinders of the internal combustion engine given a perfect ignition efficiency, no cylinder shutdown and an ideal air/fuel ratio which can for example be the stoichiometric air/fuel ratio or a suitably enriched air/fuel ratio. The efficiency values EFF_XX are multiplied by the reference torque in order to determine the first basic torque TQI_BAS1. The efficiency values EFF_XX are predefined such that they take into consideration for example an optimum ignition angle, an optimum air/fuel ratio, an optimum cylinder turn-on level in respect of permissible harmful emissions or a knocking or further limit conditions. Thus, in the case of the first basic torque TQI_BAS1, this is a real torque to be set by way of the internal combustion engine. The first air mass stream MAF1 can also be determined by way of a dynamic physical model of the first intake tract 1 and represents the air mass which flows into the respective cylinders.

In a block B12, a first required value TQI_FAST1 of the torque to be set quickly is determined depending on the intermediate required value TQI_INT_SP_FAST of the torque to be set quickly, of the first basic torque TQI_BAS1 and of the sum correction value COR_SUM. This is achieved preferably by the fact that the intermediate required value TQI_INT_SP_FAST is limited upwards to the first basic torque TQI_BAS1 and the sum correction value COR_SUM is subsequently added. By this means it is possible to simply allow torque—reducing actions—represented by the sum correction value COR_SUM with a possible negative value—to take effect around the basic torque TQI_BAS1.

In a block B14, depending on the first required value TQI_FAST1 of the torque to be set quickly, one or more control signals are determined and generated for one or more final control elements for setting the quantity of fuel that is to be metered or the ignition angle, and this is actually done for the corresponding final control elements which are associated with the first cylinder bank.

The respective time constants for setting the first required value TQI_SLOW1 of the torque to be set slowly is [sic] dependent on rotational speed and greater by one to two orders of magnitude than the time constant for setting the first required value TQI_FAST1 of the torque to be set quickly.

In addition, a block B16 is provided which comprises a communications interface of the first control device 25. The communications interface of the first control device 25 is designed in order to send data over a data bus which, for example, can be a CAN Bus or also a FlexRay Bus. The communications interface of the first control device 25 is designed in this connection in order to send the intermediate required value TQI_INT_SP_FAST of the torque to be set quickly, of the sum correction value COR_SUM and preferably also of the intermediate required value TQI_INT_SP_SLOW of the torque to be set slowly to a communications interface of the second control device 44.

The second control device 44 comprises a block B18 (FIG. 3) which includes the communications interface of the second control device 44. Output variables from the block B18 are the intermediate required value TQI_INT_SP_SLOW of the torque to be set slowly, the intermediate required value TQI_INT_SP_FAST of the torque to be set quickly and the sum correction value COR_SUM.

In addition, a block B20 is provided which corresponds to the block B8, whereby the second air mass stream MAF2, which is sensed by the second air mass sensor 46 or is determined by means of a corresponding dynamic physical model of the second intake tract, is delivered as the input variable instead of the first air mass stream MAF1. Accordingly, the output variable from the block B20 is a second basic torque TQI_BAS2.

A block B22 corresponds to the block B4 with the difference that the corresponding output variable is the second required value TQI_SLOW2 of the torque to be set slowly. A block B24 corresponds to the block B6 with the difference that corresponding final control elements which are associated with the second cylinder bank are controlled depending on the second required value TQI_SLOW2 of the torque to be set slowly.

A block B26 corresponds to the block B12 with the difference that the second torque TQI_BAS2 is delivered to it instead of the first torque TQI_BAS1 and that its output variable is a second required value TQI_FAST2 of the torque to be set quickly. In a block B28, depending on the second required value TQI_FAST2 of the torque to be set quickly, control signals are determined and generated for final control elements for setting the quantity of fuel that is to be metered and the ignition angle, which are associated with the second cylinder bank. These can thus be the respective injection valves 19 and the respective spark plugs 18, for example.

Instead of the sum correction value COR_SUM, the individual correction values, such as the idling fast correction value COR_IS and/or the anti-jolting fast correction value COR_AJ can also be transferred by way of the communications interface of the first control device 25 to the communications interface of the second control device 44. Accordingly, the input variables of the block B26 or also B12 are then also adapted correspondingly. The correction values, the input variable for the block B10 are preferably derived from fast portions of regulator correcting variables, in other words from corresponding P or D portions for example.

The invention claimed is:

1. A multi-cylinder internal combustion engine control system, comprising:
- a first control device associated with a first section of the engine cylinders, configured to:
  - determine a correction value for a torque based on an operating variable of the engine,
  - determine an intermediate torque required value by way of a final control element based on an operating variable of the engine,
  - determine a quantity of fuel or an ignition angle based on the intermediate torque required value;
- a second control device associated with a second section of the cylinders, configured to determine a fast torque required value based on:
  - the intermediate torque required value,
  - the correction value, and
  - a measured variable associated with the second control device; and
- a communications interface for communicating the intermediate required value and the correction value to a communications interface of a second control device.

2. The engine control system as claimed in claim 1, wherein the first section of engine cylinders comprise a first group of complete engine cylinders.

3. The engine control system as claimed in claim 1, wherein the correction value is based on a plurality of operating variables of the engine.

4. The engine control system as claimed in claim 1, wherein the second section of engine cylinders comprise a second group of complete engine cylinders.

5. The engine control system as claimed in claim 1, wherein the second control device is configured to determine a maximum basic torque using a measured variable associated with the second control device as an input.

6. The engine control system as claimed in claim 5, wherein the second control device determines the fast torque required value based on the basic torque.

7. The engine control system as claimed in claim 6, wherein a correction value includes a fast portion of a regulator correcting variable.

8. The engine control system as claimed in claim 7, wherein the first control device is configured to communicate the correction values as a sum correction value.

9. The engine control system as claimed in claim 7, wherein the second control device is subordinate to the first control device.

10. A multi-cylinder internal combustion engine, comprising:
- a mass flow measuring device positioned in an intake tract that measure an operative intake air mass flow of the engine;
- a throttle valve arranged in the intake tract;
- an intake manifold connected to the intake tract and arranged downstream of the throttle valve;
- a plurality of cylinders, each cylinder connected to the intake manifold via an intake valve;
- an exhaust manifold connected to the plurality of cylinders, each cylinder connected to the exhaust manifold via an exhaust valve; and
- an engine management system comprising:
  - a first control device associated with a first group of engine cylinders, configured to:
    - determine a correction value for a torque based on an operating variable of the engine,
    - determine an intermediate torque required value by way of a final control element based on an operating variable of the engine,
    - determine a quantity of fuel or an ignition angle based on the intermediate torque required value;
  - a second control device associated with a second group of engine cylinders where the second control device is subordinate to the first control device, configured to determine a fast torque required value based on:
    - the intermediate torque required value,
    - the correction value, and
    - a measured variable associated with the second control device; and
  - a communications interface for communicating the intermediate required value and the correction value to a communications interface of a second control device.

11. The engine as claimed in claim 10, wherein the second control device is configured to determine a maximum basic torque using a measured variable associated with the second control device as an input.

12. The engine as claimed in claim 10, wherein the second control device determines the fast torque required value based on the basic torque.

13. The engine as claimed in claim 10, wherein a correction value includes a fast portion of a regulator correcting variable.

14. The engine as claimed in claim 10, wherein the first control device is configured to communicate the correction values as a sum correction value.

15. A method of controlling a multi-cylinder internal combustion engine, comprising:
- determining by a first control device:
  - a correction value for a torque based on an operating variable of the engine,
  - an intermediate torque required value by way of a final control element based on an operating variable of the engine,
  - a quantity of fuel or an ignition angle based on the intermediate torque required value;
- determining by a second control device where the second control device is subordinate to the first control device a fast torque required value based on:
  - the intermediate torque required value,
  - the correction value, and a measured variable associated with the second control device; and communicating the intermediate required value and the correction value from the first control device to the second control device.

16. The method as claimed in claim 15, wherein the second control device determines a maximum basic torque using a measured variable associated with the second control device as an input.

17. The engine as claimed in claim 15, wherein the second control device determines the fast torque required value based on the basic torque.

18. The engine as claimed in claim 15, wherein a correction value includes a fast portion of a regulator correcting variable.

19. The engine as claimed in claim 15, wherein the first control device is configured to communicate the correction values as a sum correction value.

20. The engine as claimed in claim 15 wherein the communications interface communicates a plurality of correction values to the second control device.

* * * * *